US012620304B2

(12) United States Patent
Yang et al.

(10) Patent No.: US 12,620,304 B2
(45) Date of Patent: May 5, 2026

(54) INFORMATION PROCESSING METHOD AND DEVICE

(71) Applicant: Lenovo (Beijing) Limited, Beijing (CN)

(72) Inventors: Qingyu Yang, Beijing (CN); Yang Lei, Beijing (CN); Junming Xia, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 242 days.

(21) Appl. No.: 18/233,766

(22) Filed: Aug. 14, 2023

(65) Prior Publication Data

US 2024/0071212 A1 Feb. 29, 2024

(30) Foreign Application Priority Data

Aug. 31, 2022 (CN) .......................... 202211063239.4

(51) Int. Cl.
| | |
|---|---|
| *G08G 1/00* | (2006.01) |
| *G06T 7/20* | (2017.01) |
| *G08G 1/01* | (2006.01) |
| *G08G 1/056* | (2006.01) |

(52) U.S. Cl.
CPC ............. *G08G 1/0133* (2013.01); *G06T 7/20* (2013.01); *G08G 1/056* (2013.01)

(58) Field of Classification Search
CPC .... G08G 1/0133; G08G 1/056; G08G 1/0112; G08G 1/0116; G08G 1/0145; G08G 1/04; G08G 1/08; G08G 1/083; G08G 1/00; G06T 7/20
USPC ......................................................... 701/118
See application file for complete search history.

(56) References Cited

U.S. PATENT DOCUMENTS

2022/0044559 A1* 2/2022 Gao ..................... G08G 1/0145

* cited by examiner

*Primary Examiner* — Shardul D Patel
(74) *Attorney, Agent, or Firm* — ANOVA LAW GROUP, PLLC

(57) ABSTRACT

An information processing method includes obtaining at least two sets of traffic information of a target intersection based on a predetermined cycle, analyzing the at least two sets of traffic information to obtain first parameter information of vehicles passing through and second parameter information of vehicles not passing through a target phase at the target intersection in a current cycle, and obtaining a degree of saturation of the target phase at the target intersection in a current phase cycle based on the first parameter information and the second parameter information.

20 Claims, 7 Drawing Sheets

S101

Obtain at least two sets of traffic information of a target intersection based on a predetermined circle

S102

Analyze the at least two sets of traffic information to obtain first parameter information of vehicles passing through a target phase and second parameter information of vehicles not passing through the target phase of the target intersection in a current cycle.

S103

Based on the first parameter information and the second parameter information, obtain the degree of saturation of the target phase of the target intersection in the current phase cycle

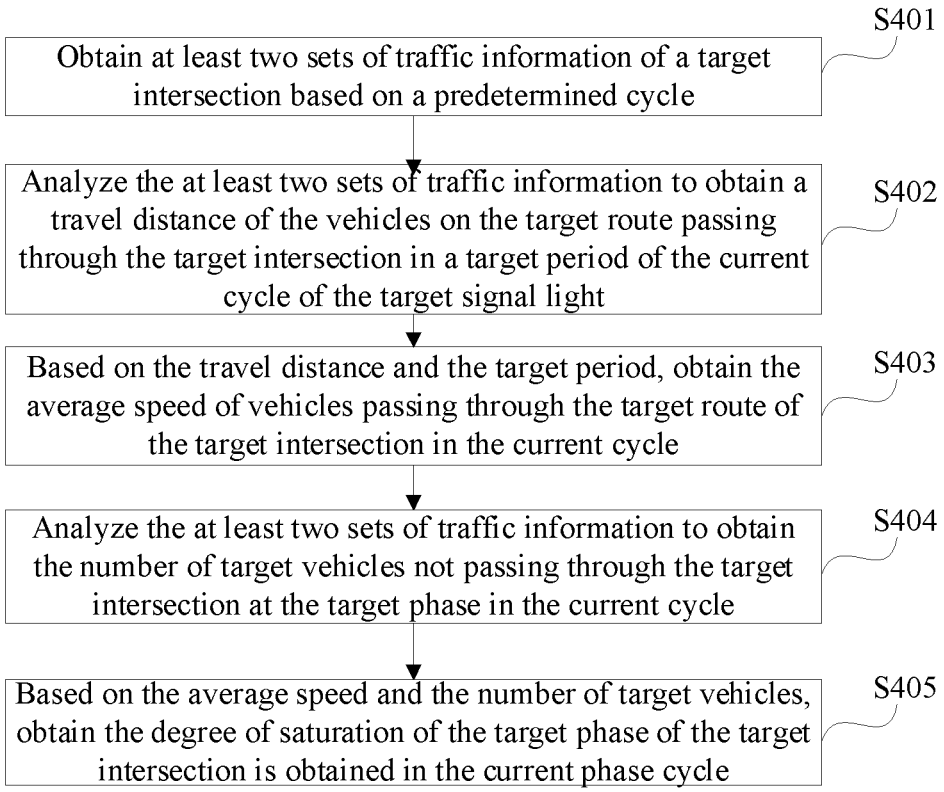

S401

Obtain at least two sets of traffic information of a target intersection based on a predetermined cycle

S402

Analyze the at least two sets of traffic information to obtain a travel distance of the vehicles on the target route passing through the target intersection in a target period of the current cycle of the target signal light

S403

Based on the travel distance and the target period, obtain the average speed of vehicles passing through the target route of the target intersection in the current cycle

S404

Analyze the at least two sets of traffic information to obtain the number of target vehicles not passing through the target intersection at the target phase in the current cycle

S405

Based on the average speed and the number of target vehicles, obtain the degree of saturation of the target phase of the target intersection is obtained in the current phase cycle

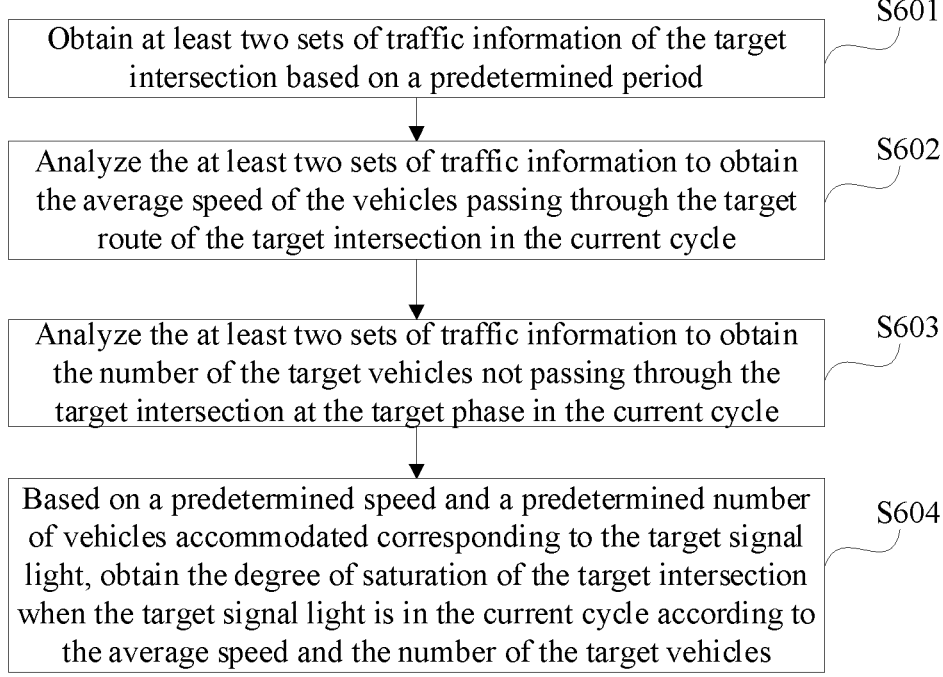

S601

Obtain at least two sets of traffic information of the target intersection based on a predetermined period

S602

Analyze the at least two sets of traffic information to obtain the average speed of the vehicles passing through the target route of the target intersection in the current cycle

S603

Analyze the at least two sets of traffic information to obtain the number of the target vehicles not passing through the target intersection at the target phase in the current cycle

S604

Based on a predetermined speed and a predetermined number of vehicles accommodated corresponding to the target signal light, obtain the degree of saturation of the target intersection when the target signal light is in the current cycle according to the average speed and the number of the target vehicles

FIG. 6

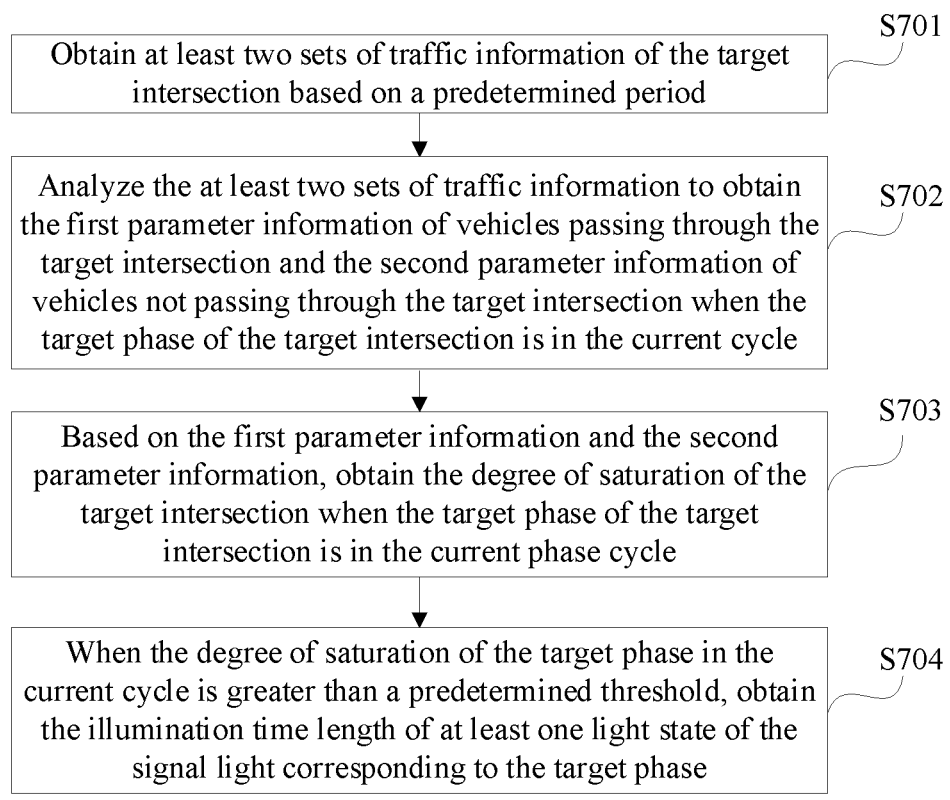

Obtain at least two sets of traffic information of the target intersection based on a predetermined period — S701

Analyze the at least two sets of traffic information to obtain the first parameter information of vehicles passing through the target intersection and the second parameter information of vehicles not passing through the target intersection when the target phase of the target intersection is in the current cycle — S702

Based on the first parameter information and the second parameter information, obtain the degree of saturation of the target intersection when the target phase of the target intersection is in the current phase cycle — S703

When the degree of saturation of the target phase in the current cycle is greater than a predetermined threshold, obtain the illumination time length of at least one light state of the signal light corresponding to the target phase — S704

FIG. 7

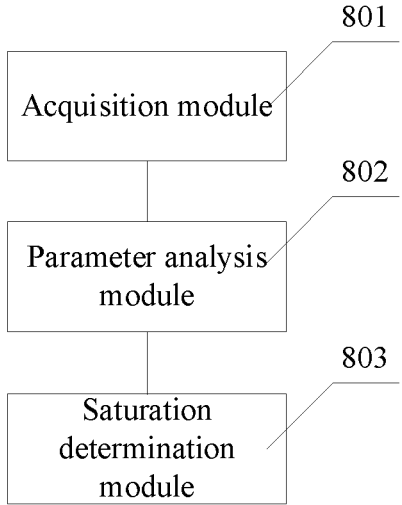

Acquisition module — 801

Parameter analysis module — 802

Saturation determination module — 803

FIG. 8

INFORMATION PROCESSING METHOD AND DEVICE

CROSS-REFERENCE TO RELATED APPLICATION

The present disclosure claims priority to Chinese Patent Application No. 202211063239.4, filed on Aug. 31, 2022, the entire content of which is incorporated herein by reference.

TECHNICAL FIELD

The present disclosure relates to the information technology field and, more particularly, to an information processing method and a device.

BACKGROUND

With the continuous development of the traffic signal controller, a plurality of optimization solutions are developed. Manufacturers of traffic signal controllers realize central solution optimization and regional coordination control. However, with the rapid development of vehicle-to-road cooperative technology, various perception data are analyzed in real-time according to holographic perceptions of vehicles on the road. A new traffic optimization method is developed, which realizes signal device control in a second level.

In algorithms for controlling traffic signals, saturation is an important indicator to measure the traffic condition. Therefore, a relevant algorithm uses the saturation as a core factor to determine a duration of a green light of the traffic lights. The calculation of the saturation depends on traffic volume and traffic capacity. Traffic volume refers to the number of vehicles traveling in both directions per unit time. Traffic capacity refers to a maximum number of vehicles passing through a certain section of a road in a unit time under certain road and traffic conditions.

Due to the limitation of sensor capability in a traditional intersection, in the existing technology, saturation is normally calculated using the traffic volume. However, traffic volume can only provide statistics on the number of vehicles passing through the intersection and cannot provide comprehensive consideration for the actual situation at the intersection. Thus, the determined saturation is not accurate.

SUMMARY

Embodiments of the present disclosure provide an information processing method. The method includes obtaining at least two sets of traffic information of a target intersection based on a predetermined cycle, analyzing the at least two sets of traffic information to obtain first parameter information of vehicles passing through and second parameter information of vehicles not passing through a target phase at the target intersection in the cycle, and obtaining a degree of saturation of the target phase at the target intersection in a current phase cycle based on the first parameter information and the second parameter information.

Embodiments of the present disclosure provide an electronic device, including a processor and a memory. The memory storing a processing program that, when executed by the processor, causes the processor to obtain at least two sets of traffic information of a target intersection based on a predetermined cycle, analyze the at least two sets of traffic information to obtain first parameter information of vehicles passing through and second parameter information of vehicles not passing through a target phase at the target intersection in the cycle, and obtain a degree of saturation of the target phase at the target intersection in a current phase cycle based on the first parameter information and the second parameter information.

Embodiments of the present disclosure provide a non-transitory computer-readable storage medium storing a computer program that, when called and executed by the processor, causes the processor to obtain at least two sets of traffic information of a target intersection based on a predetermined cycle, analyze the at least two sets of traffic information to obtain first parameter information of vehicles passing through and second parameter information of vehicles not passing through a target phase at the target intersection in the cycle, and obtain a degree of saturation of the target phase at the target intersection in a current phase cycle based on the first parameter information and the second parameter information.

BRIEF DESCRIPTION OF THE DRAWINGS

FIG. 4 illustrates a schematic flowchart of an information processing method according to some embodiments of the present disclosure.

FIG. 6 illustrates a schematic flowchart of an information processing method according to some embodiments of the present disclosure.

FIG. 7 illustrates a schematic flowchart of an information processing method according to some embodiments of the present disclosure.

FIG. 8 illustrates a schematic structural diagram of an information processing device according to some embodiments of the present disclosure.

DETAILED DESCRIPTION OF THE EMBODIMENTS

The technical solution of embodiments of the present disclosure is described in detail below in connection with the accompanying drawings of embodiments of the present disclosure. Described embodiments are only some embodiments of the present disclosure and not all embodiments. All other embodiments obtained by those of ordinary skill in the art without creative efforts are within the scope of the present disclosure.

Figure 1:
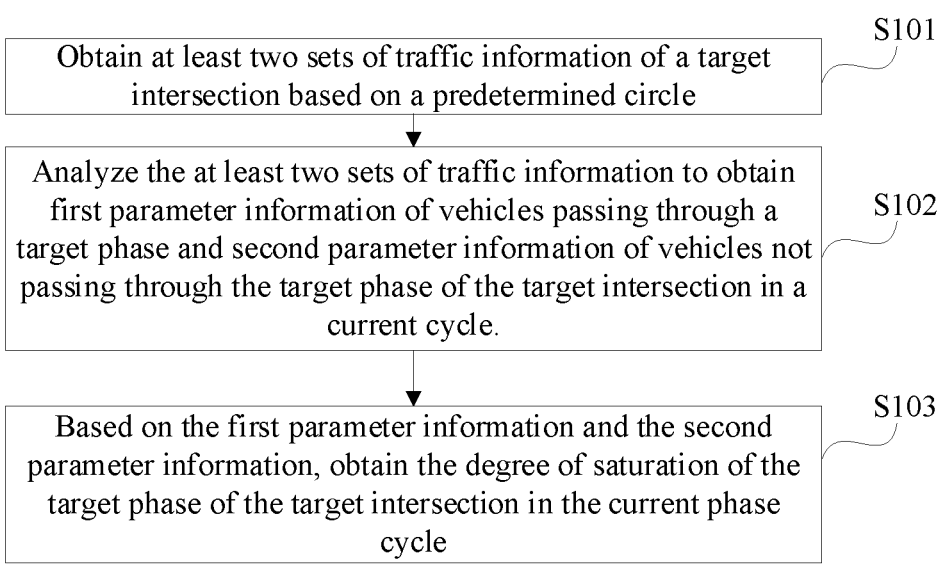
FIG. 1 illustrates a schematic flowchart of an information processing method according to some embodiments of the present disclosure.

FIG. 1 illustrates a schematic flowchart of an information processing method according to some embodiments of the present disclosure. The method can be applied to an electronic device. The method includes the following steps.

At S101, at least two sets of traffic information of a target intersection are obtained based on a predetermined circle.

In some embodiments, the solution can be applied to an electronic device arranged at an intersection. The electronic device can be configured to process the traffic information of the intersection to determine the degree of saturation of the intersection.

Image collection devices (such as cameras) arranged at various intersections can be configured to collect traffic conditions of the intersections. The content collected can include situations of vehicles associated with routes corresponding to phases of the intersections. Traffic lights are arranged at the intersections. A control module of the traffic lights can be configured to control the sequence of the traffic lights and the time length of each light state.

In some embodiments, the traffic information can include video information captured by the image collection devices, a cycle of the traffic lights, and the duration of each light state.

The light state of the traffic lights can include a red light state, a green light state, and a yellow light state.

In some embodiments, the image collection device and the control module can be configured to add identification to the collected information and then upload the information to a central control module. The central control module can be configured to send a traffic signal to the electronic device at each intersection. The electronic device can be configured to obtain the traffic information of the intersection based on the identification of the traffic information. The identification in the traffic information can correspond to the intersection.

In some embodiments, the image collection devices and the control modules arranged at the intersections can be configured to upload information according to the predetermined cycles. The predetermined cycles of the image collection device and the control module can be different or the same. The central control module can be configured to send the traffic information to the electronic devices of the intersections according to the predetermined cycle. The electronic device can be configured to determine the traffic information of the corresponding intersection. The predetermined cycle of the central control module for sending the traffic information can be the same as or different from the predetermined cycles of the image collection device and the control module for uploading the information. The three predetermined cycles can be set according to actual situations, which are not limited in the present disclosure.

At S102, the at least two sets of traffic information are analyzed to obtain first parameter information of vehicles passing through and second parameter information of vehicles not passing through the target phase of the target intersection in a current cycle.

A plurality of sets of traffic information can be analyzed to obtain information of the vehicles passing through the target phase and information of the vehicles not passing through the target phase of the target intersection in the current cycle.

The phase of the intersection can refer to controlling the directions to display different colors of lights based on the traffic lights. The green light state of the traffic lights can be used to indicate vehicles in lanes of the corresponding direction to move forward.

For example, an intersection can include four directions, such as north, south, east, and west. Each direction can include three travel directions of left turn, straight, and right turn for vehicles. In addition, four crossing directions of north, south, east, and west can be included for pedestrians. Thus, the intersection can have 16 phases, which include 12 phases corresponding to lanes for vehicles and 4 phases corresponding to pedestrian crossings. The 12 phases corresponding to vehicles can include North Left, North Straight, North Right, South Left, South Straight, South Right, West Left, West Straight, West Right, East Left, East Straight, and East Right. In one cycle, the phases can appear in sequence.

In the solution, the passing-through capacity of the vehicles in lanes at a certain intersection can be analyzed to determine a degree of saturation.

In some embodiments, the plurality of sets of traffic information can be analyzed to obtain the first parameter information for the vehicles passing through the target phase and the second parameter information for the vehicles not passing through the target phase in the current cycle. Then, the passing-through capacity can be determined based on the number of vehicles passing through and the number of vehicles not passing through a certain intersection in the phase cycle.

At S103, based on the first parameter information and the second parameter information, the degree of saturation of the target phase of the target intersection is obtained in the current phase cycle.

The vehicles passing through and not passing through the target phase in the current phase cycle can represent the traffic passing through the situation of the lane corresponding to the phase. The degree of saturation of the target phase of the target intersection can be determined in the current phase cycle based on the situation of the vehicle passing through.

In some embodiments, when more vehicles pass through, the passing-through capacity of the lane corresponding to the target phase of the target intersection can be stronger. However, when more vehicles do not pass through, the passing-through capacity of the lane corresponding to the target phase of the target intersection can be poorer. When the passing-through capacity is stronger, the degree of saturation of the intersection can be lower.

The obtained degree of saturation is described in detail subsequently, which is not described here in detail.

In summary, embodiments of the present disclosure provide the information processing method. The method includes obtaining the at least two sets of traffic information of the target intersection based on the predetermined cycle, analyzing the at least two sets of traffic information to obtain the first parameter information of the vehicles passing through and the second parameter information of the vehicles not passing through of the target phase of the target intersection in the current cycle, and obtaining the degree of saturation of the target phase of the target intersection in the current cycle based on the first parameter information and the second parameter information. In the solution, based on traffic information of the target intersection in a plurality of cycles, the first parameter value of the vehicles of the target phase passing through the target intersection in a certain cycle and the second parameter value of the vehicles of the same phase not passing through the intersection in the same cycle can be determined. The first parameter value of the vehicles passing through and the second parameter value of the vehicles not passing through can be used to represent the passing-through capacity of the target phase of the intersection. Based on the passing-through capacity of the intersection, the degree of saturation of the target signal light of the target intersection can be determined in the current cycle. The degree of saturation can be determined according to the actual situation of the vehicles passing through and the vehicles not passing through in the intersection, which can reflect the actual traffic situation of the intersection.

Figure 2:
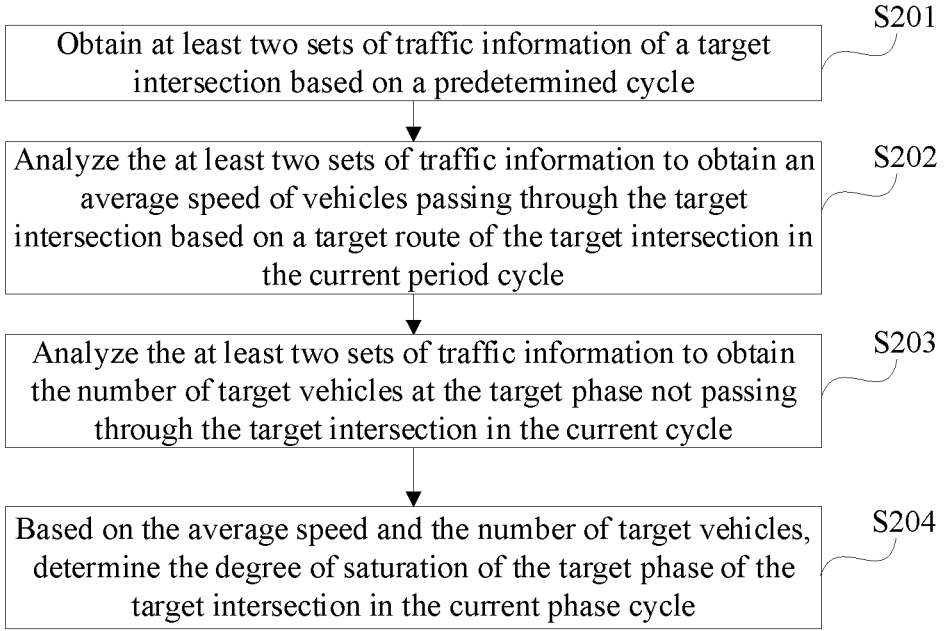
FIG. 2 illustrates a schematic flowchart of an information processing method according to some embodiments of the present disclosure.

FIG. 2 illustrates a schematic flowchart of an information processing method according to some embodiments of the present disclosure. The method includes the following steps.

At S201, at least two sets of traffic information of a target intersection are obtained based on a predetermined cycle.

Step S201 is consistent with step S101 above, which is not repeated here.

At S202, the at least two sets of traffic information are analyzed to obtain an average speed of vehicles passing through the target intersection based on a target route of the target intersection in the current period cycle.

The target route can correspond to the target phase.

The degree of saturation of the target intersection can be determined for the current phase cycle and the target route corresponding to the target phase.

In some embodiments, the target route corresponding to the target phase can be determined first. Then, the average speed of the vehicles passing through the intersection can be determined based on the target route in the current cycle.

For example, if the target phase is a North Straight phase, the average speed of the vehicles passing through the intersection in a North Straight route can be determined in the current cycle.

Figure 3:
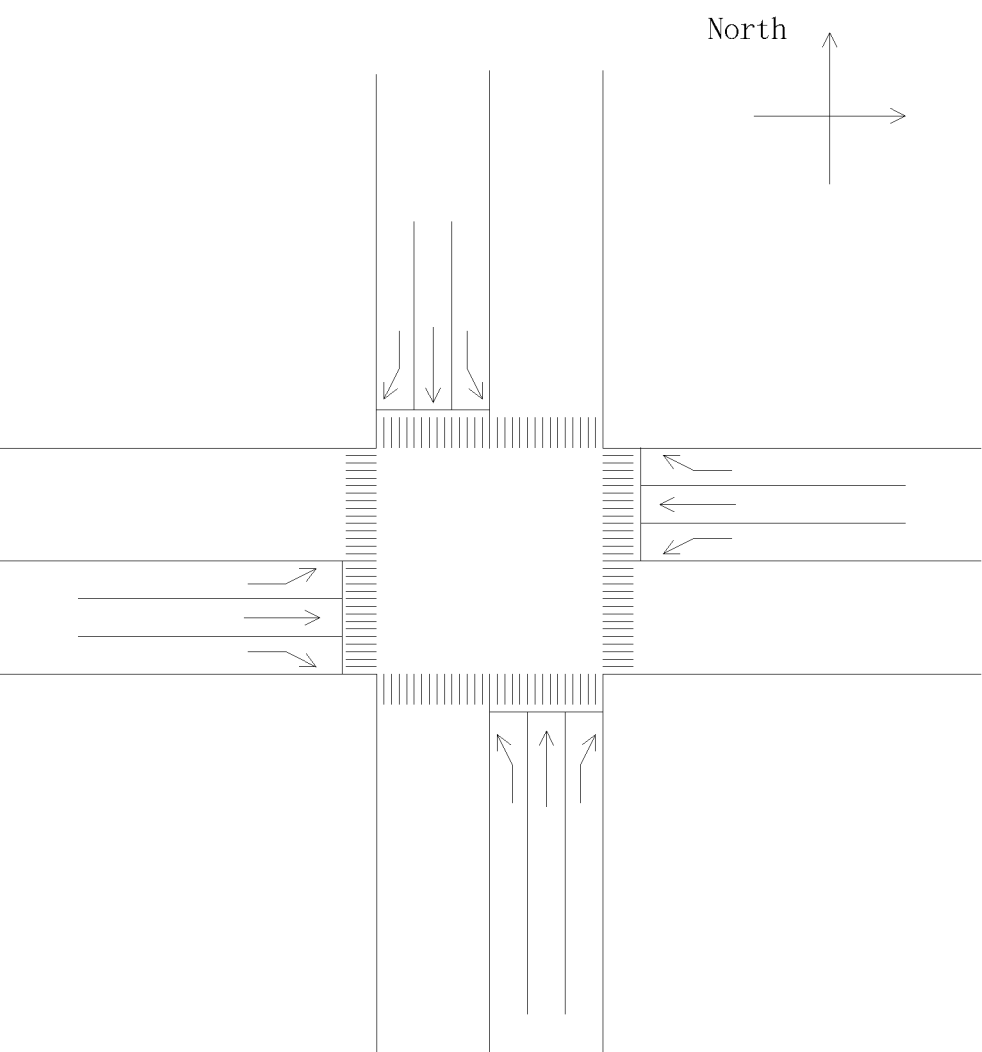
FIG. 3 illustrates a schematic diagram of a target intersection in the information processing method according to some embodiments of the present disclosure.

FIG. 3 illustrates a schematic diagram of a target intersection in the information processing method according to some embodiments of the present disclosure. The target intersection is a crossroad including 12 phases corresponding to vehicle lanes. The 12 phases corresponding to the vehicle lanes include North Left, North Straight, North Right, South Left, South Straight, South Right, West Left, West Straight, West Right, East Left, East Straight, and East Right. If North Straight is the target phase, the route corresponding to North Straight can be the target route.

At S203, the at least two sets of traffic information are analyzed to obtain the number of target vehicles at the target phase not passing through the target intersection in the current cycle.

A number of remaining vehicles before a stop line in the target route of the target intersection can be counted at the end of the target phase and can be recorded as the target vehicles not passing through the target intersection.

For example, the remaining vehicles within 150 meters before the stop line can be counted in the target route of the target intersection.

As shown in FIG. 3, three vehicles remain on the route of North Straight.

In some embodiments, since the image collection device arranged at the target intersection can perform image collection on the space around the stop line and within a preset distance before the stop line, the number of vehicles stopping in an area before the stop line can be determined based on the images collected by the image collection device.

In some embodiments, each vehicle can include a positioning device. The positioning device can upload a vehicle position to the central control module in real-time. Thus, the central control module can send the vehicle real-time position to the electronic device performing the solution. Accordingly, the electronic device can be configured to determine the number of vehicles not passing the target intersection based on the real-time position and the position relationship with the stop line of the target route.

At S204, based on the average speed and the number of target vehicles, the degree of saturation of the target phase of the target intersection is determined in the current phase cycle.

Step S204 is consistent with step S103 above, which is not repeated here.

In summary, embodiments of the present disclosure provide the information processing method. The method includes analyzing the at least two sets of traffic information to obtain the average speed of the vehicles passing through the target intersection on the target route at the target intersection. The target route corresponds to the target phase. The method further includes analyzing the at least two sets of traffic information to obtain the number of target vehicles not passing through the target intersection in the target phase in the current cycle. In the solution, the first parameter information is based on the average speed of the vehicles passing through the target intersection on the target route, and the second parameter information is based on the number of target vehicles not passing through the target intersection in the target phase. The degree of saturation of the target signal light of the target intersection can be determined in the current cycle based on the two parameters representing the passing-through capability of the intersection.

FIG. 4 illustrates a schematic flowchart of an information processing method according to some embodiments of the present disclosure. The method includes the following steps.

At S401, at least two sets of traffic information of a target intersection are obtained based on a predetermined cycle.

Step S401 is consistent with step S201, which is repeated here.

At S402, the at least two sets of traffic information are analyzed to obtain a travel distance of the vehicles on the target route passing through the target intersection in a target period of the current cycle of the target signal light.

The target period can refer to a moment that the green light state of the signal lights is turned on to an ending moment of the green light state. The traffic information can include vehicle information of the vehicles that appear at the target intersection and the information of at least one signal light at the target intersection. The target signal light can correspond to the target phase of the target intersection.

Several vehicles can pass through on the target route corresponding to the target phase of the target intersection.

In some embodiments, the travel distance of the vehicle can be determined through the speed of several vehicles passing through the target route corresponding to the target phase.

The traffic information can also include the real-time vehicle position, which is obtained by the positioning device arranged in the vehicle. The positioning device can obtain and upload the real-time vehicle position to the central control module. Thus, the central control module can send the real-time vehicle position to the electronic device performing the solution.

In some embodiments, after the electronic device of embodiments of the present disclosure receives the image collected by the image collection device, the electronic device can recognize the vehicle in the image to construct a unique identifier (in a string format) for the vehicle that is recognized for the first time. In connection with the received real-time vehicle position, the real-time vehicle position and the corresponding time can be recorded to form a table. If a vehicle enters the collection area of the image collection device again, only the real-time position of the vehicle and the corresponding time can be updated in the table corresponding to the vehicle identifier.

Since the vehicle normally does not pass through the same intersection continuously in a short time, to reduce the storage load of the electronic device, the table with an update time greater than a predetermined time threshold can be deleted.

For example, if the table is not updated within 20 minutes, the table can be deleted. The time threshold can be set according to the actual situation, which is not limited in the present disclosure.

In some embodiments, based on the target period of the target signal light in the current cycle, the real-time vehicle positions can be filtered to obtain the vehicles that appear at the target intersection in the target period. If the vehicle passes through the target intersection in the target period, a full length of the target route at the target intersection can be used as the travel distance of the vehicle.

The full length of the target route can be set according to actual situations, for example, from a first predetermined position of entering the intersection to a second predetermined position of leaving the intersection. The first predetermined position and the second predetermined position each can be on a side of the stop line away from the intersection.

In some embodiments, a vehicle may enter the target intersection before the end of the green light state. However, the vehicle may not leave the target intersection when the green light state ends. Thus, the target period can be from the start moment when the green light state of the signal light is turned on to a moment several seconds (e.g., 3 seconds) after the end moment. The vehicle information of the vehicles appearing at the target intersection can be collected in the period.

In some embodiments, step S402 includes the following sub-steps.

At S4021, the vehicle information of the at least two sets of traffic information is analyzed to obtain at least two vehicles passing through the target intersection and trajectories of the at least two vehicles.

The plurality of vehicles passing through the target intersection and the trajectories of the plurality of vehicles can be obtained from the vehicle information associated with the plurality of sets of traffic information.

When vehicles are determined to pass through the target intersection, the vehicles passing through the target intersection and the trajectories of the vehicle can be determined.

In some embodiments, the trajectories of the vehicles can be determined based on the real-time vehicle positions.

For example, 5 vehicles can be determined at the target intersection, and the 5 vehicles can pass through the intersection in a phase of North Straight.

At S4022, if the trajectories of the at least two vehicles are the same as the routes corresponding to the target signal light, the travel distances of the at least two vehicles in the target period of the target signal light in the current cycle are determined based on the vehicle positions of the at least two vehicles in the vehicle information.

Since signal lights of a plurality of routes can be green at the same time, or the signal lights can be green at different times, the travel trajectories of the plurality of vehicles passing through the target intersection can be determined to correspond to the route corresponding to a certain signal light.

After the route corresponding to the travel trajectories of the vehicles is determined, the travel distances of the plurality of vehicles in the target period can be determined based on the vehicle positions.

The travel distances of the vehicles in the target period can be determined based on the real-time positions of the vehicles at the start time and end time of the target period.

At S403, based on the travel distance and the target period, the average speed of vehicles passing through the target route of the target intersection in the current cycle is obtained.

After the travel distance of each vehicle passing through the target intersection and the duration of the target period are determined, an average speed of each vehicle can be obtained.

A sum of the average speed of each vehicle of the plurality of vehicles passing through the target intersection can be calculated. The average speed of the vehicles passing through the target route of the target intersection can be calculated in the current cycle according to the sum and the number of the plurality of vehicles.

According to the influence factors of the degree of saturation, the degree of saturation can be also related to the travel speed and travel time. When the travel speed of the road is higher, and the travel time is shorter, the degree of saturation can be lower, otherwise the degree of saturation can be higher. With the holographic perception data of the vehicle networking at the intersection, the average speed and the time length of the vehicle passing through the intersection can be accurately calculated under the green light.

At S404, the at least two sets of traffic information are analyzed to obtain the number of target vehicles not passing through the target intersection at the target phase in the current cycle.

At S405, based on the average speed and the number of target vehicles, the degree of saturation of the target phase of the target intersection is obtained in the current phase cycle.

Steps S404 and S405 are consistent with steps S203 and 204, which are not repeated here.

In summary, embodiments of the present disclosure provide the information processing method. The method includes analyzing the at least two sets of traffic information to obtain the travel distances of the vehicles passing through the target route of the target intersection in the target period of the target signal light in the current cycle. The target period is from the start moment of the green light state of the signal lights at least to the end moment of the green light state. The traffic information can include the vehicle information of the vehicle that appears at the target intersection and the information of the at least one signal light at the target intersection. The target signal light can correspond to the target phase of the target intersection. The method further includes obtaining the average speed of the vehicles passing through the target route of the target intersection in the current cycle based on the travel distance and the target period. In the solution, based on the travel distance and the target period when the vehicle passes through the target intersection, the average speed of the plurality of vehicles passing through the target intersection can be determined to provide a basis for subsequently determining the degree of saturation of the intersection.

Figure 5:
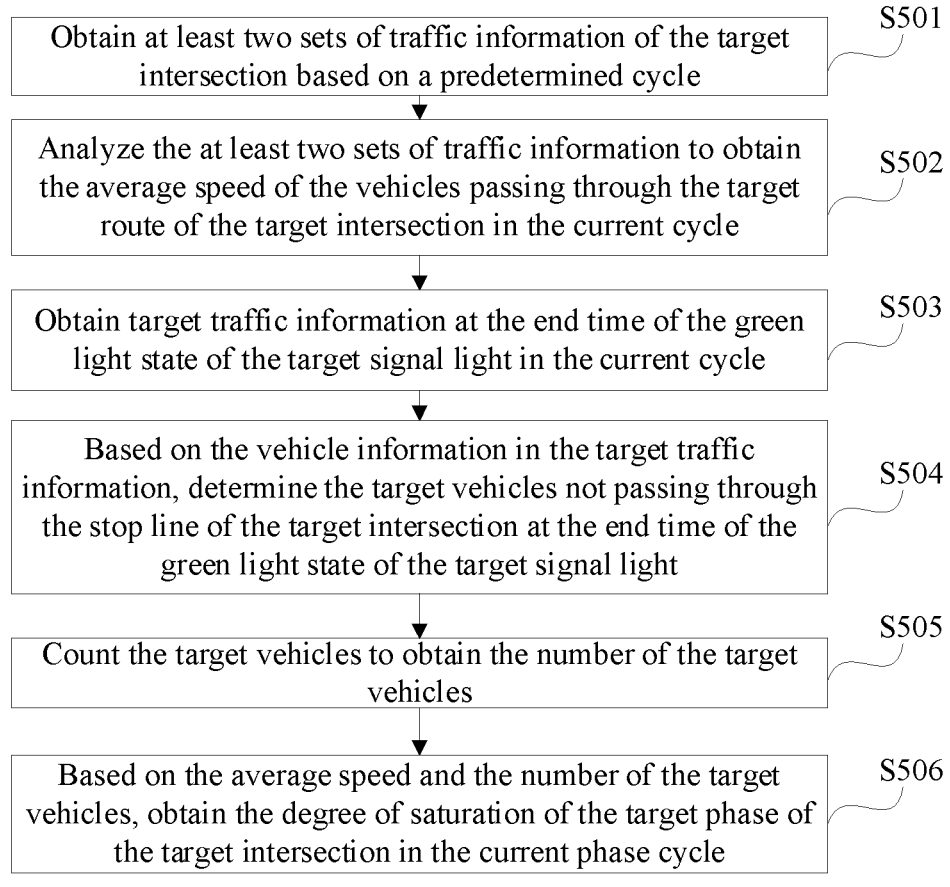
FIG. 5 illustrates a schematic flowchart of an information processing method according to some embodiments of the present disclosure.

FIG. 5 illustrates a schematic flowchart of an information processing method according to some embodiments of the present disclosure. The method includes the following steps.

At S501, at least two sets of traffic information of the target intersection are obtained based on a predetermined cycle.

At S502, the at least two sets of traffic information are analyzed to obtain the average speed of the vehicles passing through the target route of the target intersection in the current cycle.

Steps S501 and S502 are consistent with steps S201 and S202, which are not repeated here.

At S503, target traffic information at the end time of the green light state of the target signal light in the current cycle is obtained.

The end time of the green light state can be determined in the current cycle. The target traffic information at the end time can be obtained.

In some embodiments, the target traffic information can include the real-time vehicle positions.

At S504, based on the vehicle information in the target traffic information, the target vehicles not passing through the stop line of the target intersection are determined at the end time of the green light state of the target signal light.

The target vehicles not passing through the stop line of the target intersection can be determined at the end time of the green light state from the obtained vehicle information in the target traffic information.

In some embodiments, whether the vehicle passes through the stop line of the target intersection at the end time of the green light state can be determined based on the real-time vehicle position and the position of the stop line of the target intersection. If the vehicle not passing through stops moving, the vehicle not passing through the stop line of the target intersection can be determined as the target vehicle.

In some embodiments, the image collected by the image collection device in the traffic information can be analyzed to determine the vehicles within the stop line at the target intersection from the image collected by the image collection device after the green light state of the target signal light ends. The vehicle can be used as the target vehicle.

At S505, the target vehicles are counted to obtain the number of the target vehicles.

The target vehicle can be the vehicle not passing through the intersection.

The vehicles not passing through the target intersection can be counted to obtain the number of the target vehicles.

The number of the target vehicles can represent the situation of the vehicles not passing through the target intersection based on the target route. The number of the target vehicles can be positively related to the degree of saturation of the intersection. When the target vehicles are more, the degree of saturation of the target intersection can be higher, otherwise lower.

At S506, based on the average speed and the number of the target vehicles, the degree of saturation of the target phase of the target intersection is obtained in the current phase cycle.

Step S506 is consistent with step S204, which is not repeated here.

In summary, embodiments of the present disclosure provide the information processing method. The method includes obtaining the target traffic information at the end time of the green light state of the target signal light in the current cycle, determining the target vehicle not passing through the stop line of the intersection at the end time of the green light state of the target signal light based on the vehicle information in the target traffic information, and counting the target vehicles to obtain the number of the target vehicles. In the solution, after the green light state of the target signal light ends in the current cycle, the target vehicles not passing through the stop line of the target intersection can be counted to provide the basis for determining the degree of saturation of the target intersection.

FIG. 6 illustrates a schematic flowchart of an information processing method according to some embodiments of the present disclosure. The method includes the following steps.

At S601, at least two sets of traffic information of the target intersection are obtained based on a predetermined period.

At S602, the at least two sets of traffic information are analyzed to obtain the average speed of the vehicles passing through the target route of the target intersection in the current cycle.

At S603, the at least two sets of traffic information are analyzed to obtain the number of the target vehicles not passing through the target intersection at the target phase in the current cycle.

Steps S601 to S603 are consistent with steps S201 to S203, which are not repeated here.

At S604, based on a predetermined speed and a predetermined number of vehicles accommodated corresponding to the target signal light, the degree of saturation of the target intersection when the target signal light is in the current cycle is obtained according to the average speed and the number of the target vehicles.

The predetermined speed can be the speed at which the vehicle passes through the target route when the route corresponding to the target signal light satisfies the predetermined smooth traffic condition.

The predetermined smooth traffic condition can include a situation in which no vehicle that does not pass through exists when the route corresponding to the target signal light is in the green light state.

Under the predetermined smooth traffic condition, the average speed of the plurality of vehicles passing through the target route can be determined.

In some embodiments, the predetermined speed can be an average value by iterating the history speeds satisfying the smooth traffic condition. Each time when an average speed of the vehicles passing through the target route satisfies the predetermined smooth traffic condition, an average value of the newest average speed and the predetermined speed can be used as the new predetermined speed.

The number of vehicles that can be accommodated in the stop area corresponding to the target signal light can be used as the predetermined accommodated vehicle number.

In some embodiments, the stop area corresponding to the target signal light can be an area between the stop line of the vehicle lanes and the predetermined starting position. The length of the area can be the distance between the predetermined starting position and the stop line of the vehicle lanes, which uses the vehicle length of a normal sedan as the unit and the distance between the vehicles. The number of vehicles accommodated in the stop area can be calculated according to the number of vehicle lanes and the coefficient.

The formula for calculating the degree of saturation of the target intersection is:

$$C = U/V * K/N$$

where C represents the degree of saturation, U represents the average speed of the vehicles passing through the target intersection based on the target route in the target intersection, V represents the predetermined speed, K represents the number of the target vehicles not passing through the target intersection during in target phase, and N represents the predetermined accommodated vehicle number corresponding to the target signal light.

In summary, embodiments of the present disclosure provide the information processing method. The method includes determining the degree of saturation of the target intersection when the target signal light is in the current cycle based on the predetermined speed and the predetermined accommodated vehicle number corresponding to the target signal light and according to the average speed and the number of the target vehicles. The predetermined speed can be the speed at which the vehicles pass through the route corresponding to the target signal light when the predetermined smooth traffic condition can be satisfied. In the solution, based on the average speed of the vehicles passing through the target route of the target intersection, the number of the target vehicles not passing the target intersection in the target phase and the predetermined speed, and the predetermined accommodated vehicle number corresponding to the target signal light, the degree of saturation of the target intersection when the target signal light is in the current cycle can be obtained through a simple calculation.

FIG. 7 illustrates a schematic flowchart of an information processing method according to some embodiments of the present disclosure. The method includes the following steps.

At S701, at least two sets of traffic information of the target intersection are obtained based on a predetermined period.

At S702, the at least two sets of traffic information are analyzed to obtain the first parameter information of vehicles passing through the target intersection and the second parameter information of vehicles not passing through the target intersection when the target phase of the target intersection is in the current cycle.

At S703, based on the first parameter information and the second parameter information, the degree of saturation of the target intersection is obtained when the target phase of the target intersection is in the current phase cycle.

Steps S701 to S703 are consistent with steps S101 to S103, which are not repeated here.

At S704, when the degree of saturation of the target phase in the current cycle is greater than a predetermined threshold, the illumination time length of at least one light state of the signal light corresponding to the target phase is obtained.

The signal light can include at least two light states.

In some embodiments, the light states of the signal light can include green light state and red light state, or green light state, red light state, and yellow light state. The green light state can indicate a traffic participant (e.g., vehicle, pedestrian, etc.) to pass through. The red light state can indicate that traffic participants are prohibited from passing through.

In some embodiments, if the degree of saturation of the target phase of the target intersection in the current cycle is greater than the predetermined threshold, the target road condition can be in congestion at the target intersection, and the corresponding signal light may need to be adjusted.

The illumination time length of the light state of the signal light can be adjusted. For example, the time length of the green light state can be increased, and/or the time length of the red light state can be reduced.

In some embodiments, an adjustment gradient of the illumination time lengths of the light states can be determined based on the difference between the degree of saturation of the target phase in the current cycle and the predetermined threshold.

In some embodiments, the degree of saturation of the intersection of the target route corresponding to the target phase can be preset to 0.1 when no vehicles not passing through exists with the target phase is green light.

Accordingly, the predetermined threshold can be greater than 0.1, e.g., 0.3 or 0.5. The predetermined threshold can be set according to the actual situation, which is not limited in the present disclosure.

In summary, embodiments of the present disclosure provide the information processing method. The method includes adjusting the illumination time length of the at least one light state of the signal light corresponding to the target phase when the degree of saturation of the target phase in the current cycle is greater than the predetermined threshold. The signal light includes at least two light states. In the solution, if the degree of saturation of the target phase in the current cycle is greater than the predetermined threshold, the degree of saturation of the target phase can be adjusted by adjusting the illumination time length of the light state of the signal light corresponding to the target phase.

Corresponding to information processing method embodiments of the present disclosure, the present disclosure also provides device embodiments applying the information processing method.

FIG. 8 illustrates a schematic structural diagram of an information processing device according to some embodiments of the present disclosure. The device includes an acquisition module 801, a parameter analysis module 802, and a degree of saturation determination module 803.

The acquisition module 801 can be configured to obtain the at least two sets of traffic information of the target intersection based on the predetermined period.

The parameter analysis module 802 can be configured to analyze the at least two sets of traffic information to obtain the first parameter information of the vehicles passing through and the second parameter information of the vehicles not passing through the target intersection of the target phase at the target intersection in the current cycle.

The degree of saturation determination module 803 can be configured to determine the degree of saturation of the target phase of the target intersection in the current phase cycle based on the first parameter information and the second parameter information.

In some embodiments, the parameter analysis module can include a first analysis unit and a second analysis unit.

The first analysis unit can be configured to analyze the at least two sets of traffic information to obtain the average speed of the vehicles passing through the target intersection based on the target route in the current cycle. The target route can correspond to the target phase.

The second analysis unit can be configured to analyze the at least two sets of traffic information to obtain the number of target vehicles not passing through the target intersection at the target phase in the current cycle.

In some embodiments, the second analysis unit can be configured to analyze the at least two sets of traffic information to obtain the travel distance of the vehicles passing through the target route at the target intersection when the target signal light is in the target period of the current cycle. The target period can be from the start time of the green light state of the signal light to at least the end time of the green light state. The traffic information can include the vehicle information of the vehicles appearing at the target intersection and information of the at least one signal light at the target intersection. The target signal light can correspond to the target phase of the target intersection.

The second analysis unit can be further configured to, based on the travel distance and the target phase, obtain the average speed of the vehicles passing through the target route at the target intersection in the current cycle.

In some embodiments, the second analysis unit can be configured to analyze the vehicle information in the at least two sets of traffic information to obtain the at least two vehicles passing through the target intersection and the travel trajectories of the at least two vehicles, and, if the travel trajectories of the at least two vehicles are the same as the route corresponding to the target signal light, determining the travel distance of the at least two vehicles when the target signal light is in the target period of the current cycle based on the vehicle positions of the at least two vehicles in the vehicle information.

In some embodiments, the parameter analysis module includes an acquisition unit, a first determination unit, and a statistic unit.

The acquisition unit can be configured to obtain the target traffic information at the end time of the green light state of the target signal light in the current cycle.

The first determination unit can be configured to determine the target vehicles not passing through the stop line of the target intersection at the end time of the green light state of the target signal light based on the vehicle information of the target traffic information.

The statistic unit can be configured to count the number of the target vehicles to obtain the target vehicle number.

In some embodiments, the degree of saturation determination module can be configured to, based on the predetermined speed and the predetermined accommodated vehicle number corresponding to the target signal light, and in connection with the average speed and the target vehicle number, obtain the degree of saturation of the target intersection when the target signal is in the current cycle. The predetermined speed can be the speed of the vehicles passing through the target route when the route corresponding to the target signal light satisfies the predetermined smooth traffic condition.

The device further includes an adjustment module.

The adjustment module can be configured to, when the degree of saturation of the current cycle is greater than the predetermined threshold based on the target phase, adjust an illumination time length of at least one light state of the signal light corresponding to the target phase. The signal light can include at least two light states.

For the description of the structural functions of the information processing device, reference can be made to the description of the method embodiments, which is not limited.

In summary, embodiments of the present disclosure provide the information processing device. The device can be configured to obtain the at least two sets of traffic information of the target intersection based on the predetermined cycle, analyze the at least two sets of traffic information to obtain the first parameter information of the vehicles passing through and the second parameter information of the vehicles not passing through with the target phase of the target route in the current cycle, and based on the first parameter information and the second parameter information, obtain the degree of saturation of the target intersection with the target phase in the current phase cycle. In the solution, based on the traffic information of the plurality of cycles in the target intersection, the first parameter value of the vehicles passing through the target phase of the target intersection and the second parameter value of the vehicles not passing through the same phase of the intersection in the same cycle. The first parameter value of the vehicles passing through and the second parameter value not passing through can be used to represent the passing-through capability of the target phase of the intersection. Based on the passing-through capability of the intersection, the degree of saturation of the target signal light in the current cycle at the target intersection can be determined. The degree of saturation can be determined according to the actual situations of the vehicles passing through and the vehicles not passing through. The degree of saturation can reflect the actual traffic condition.

Figure 9:
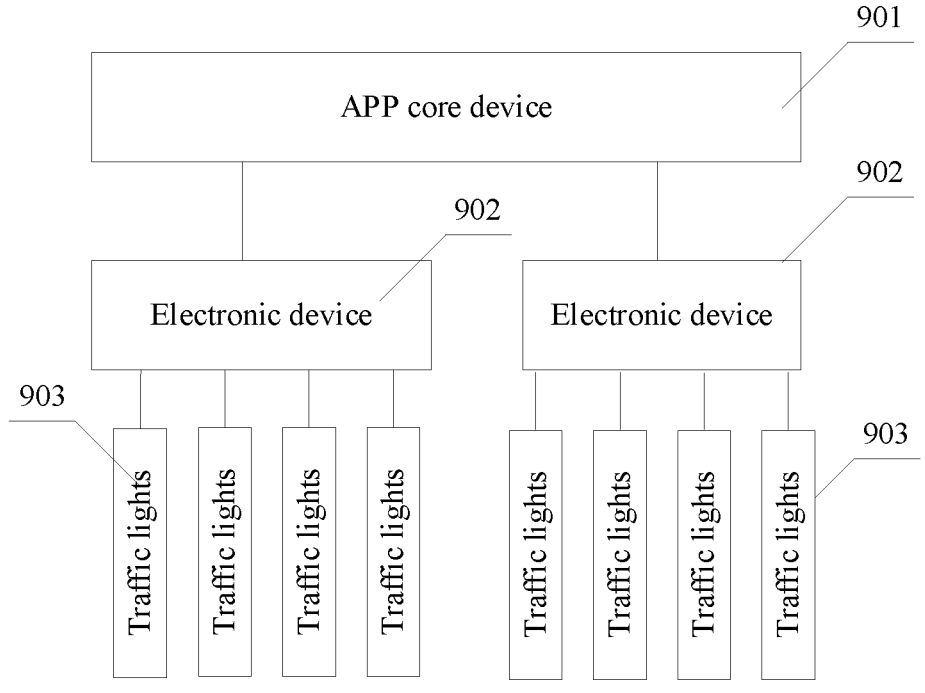
FIG. 9 illustrates a schematic diagram showing a scenario of an information processing method according to some embodiments of the present disclosure.

FIG. 9 illustrates a schematic diagram showing a scenario of an information processing method according to some embodiments of the present disclosure. The scenario includes an APP core device 901, an electronic device 902, and a traffic signal light 903.

FIG. 9 illustrates two electronic devices to represent the electronic devices connected to the plurality of APP core devices. In some embodiments, each intersection can include an electronic device. In FIG. 9, four traffic signal lights represent the traffic signal light arranged at each intersection. In some embodiments, the number of the traffic signal lights arranged at each intersection can be adjusted according to the actual condition.

The electronic device can include three functional units, such as a signal light management unit, a phase management unit, and a vehicle management unit.

The APP core device can be configured to obtain the images collected by the image collection devices arranged at the intersections and send the images captured by the image collection devices to the electronic devices arranged at the intersections.

In the initialization phase of the electronic device, based on the intersection corresponding to the electronic device, intersection frame data can be registered, the management unit and the vehicle management unit can be constructed for each signal light, and the phase management unit can be constructed for each signal light.

After receiving the images sent by the APP layer device and the real-time positions of the vehicles, the electronic device can determine the image and the real-time position corresponding to the intersection to which the electronic device belongs by searching for the intersection identifier (ID). The vehicle management unit can traverse the vehicle-related data (the image and the real-time position) corresponding to the intersection. For the vehicle entering the intersection for the first time, the vehicle management unit can create a record table. For the vehicle that enters the intersection before, the record table can be updated to record the vehicle information (position, e.g., latitude and longitude, and time).

The electronic device can analyze the vehicle trajectories when the vehicle leaves the intersection and determine the corresponding phase according to the road entering the intersection and the road leaving the intersection, and add the vehicle information to the phase management unit. The phase management unit can determine the degree of saturation of the intersection according to the light state of the signal light, the vehicle information, and the phase corresponding to the vehicle. For the determination process, reference can be made to the description of method embodiments. The signal light management unit can adjust the time length of the light state of the signal light based on the degree of saturation.

Corresponding to the information processing method embodiments of the present disclosure, the present disclosure further provides an electronic device corresponding to the information processing method and the readable storage medium.

The electronic device can include a memory and a processor.

The memory can store a processing program.

The processor can be configured to load and execute the processing program stored in the memory to implement the steps of any one of the information processing methods above.

For the execution of the information processing method by the electronic device, reference can be made to the information processing method embodiments above.

The readable storage medium can store a computer program, which can be called and executed by the processor to implement the steps of any one of the information processing methods as described in the claims.

For the execution of the information processing method by using the computer program stored in the readable storage medium, reference can be made to the information processing method embodiments above.

The various embodiments of the present disclosure are described in a progressive manner. Each embodiment focuses on the differences from other embodiments. The common and similar parts among the various embodiments can be referred to each other. Since the device of the present disclosure corresponds to the method of the present disclosure, the device can be described simply. Relevant details can be referred to in the description of the method part.

The description of embodiments of the present disclosure enables those skilled in the art to implement or use the present disclosure. Modifications to these embodiments are apparent to those skilled in the art. The general principle defined here can be implemented in other embodiments without departing from the spirit or scope of the present disclosure. Therefore, the present disclosure is not limited to embodiments of the present disclosure but should conform to the widest scope consistent with the principles and novel features of the present disclosure.

What is claimed is:

1. An information processing method comprising:
obtaining at least two sets of traffic information of a target intersection based on a predetermined cycle;
analyzing the at least two sets of traffic information to obtain first parameter information of vehicles passing through and second parameter information of vehicles not passing through a target phase at the target intersection in the cycle;
determining a degree of saturation of the target phase at the target intersection in a current phase cycle based on the first parameter information and the second parameter information; and
controlling a signal light corresponding to the target phase according to the degree of saturation of the target phase at the target intersection in the current phase cycle.

2. The method according to claim 1, wherein analyzing the at least two sets of traffic information to obtain the first parameter information of vehicles passing through and the second parameter information of vehicles not passing through the target phase at the target intersection in the current cycle includes:
analyzing the at least two sets of traffic information to obtain an average speed of the vehicles passing through the target intersection based on a target route in the current cycle, the target route corresponding to the target phase; and
analyzing the at least two sets of traffic information to obtain a number of target vehicles not passing through the target intersection at the target phase in the current cycle.

3. The method according to claim 2, wherein analyzing the at least two sets of traffic information to obtain the average speed of the vehicles passing through the target intersection based on the target route in the current cycle includes:
analyzing the at least two sets of traffic information to obtain a travel distance of the vehicles passing through the target route at the target intersection when the signal light is in a target period of the current cycle, the target period being from a start time of a green light state of the signal light at least to an end time of the green light state, the traffic information including vehicle information of a vehicle appearing at the target intersection and information of the signal light at the target intersection; and
obtaining the average speed of the vehicles passing through the target route at the target intersection in the current cycle based on the travel distance and the target period.

4. The method according to claim 3, wherein analyzing the at least two sets of traffic information to obtain the travel distance of the vehicles passing through the target route at the target intersection when the signal light is in the target period of the current cycle includes:
analyzing the vehicle information in the at least two sets of traffic information to obtain at least two vehicles passing through the target intersection and travel trajectories of the at least two vehicles; and
in response to the travel trajectories of the at least two vehicles being same as a route corresponding to the signal light, determining the travel distance of the at least two vehicles when the signal light is in the target period of the current cycle based on vehicle positions of the at least two vehicles of the vehicle information.

5. The method according to claim 2, wherein analyzing the at least two sets of traffic information to obtain the number of the target vehicles not passing through the target intersection in the current cycle at the target phase includes:
obtaining target traffic information at the end time of the green light state of the signal light in the current cycle;
based on the vehicle information of target traffic information, determining the target vehicles not passing through a stop line of the target intersection at the end time of the green light state of the signal light; and
counting the number of the target vehicles to obtain a target vehicle number.

6. The method according to claim 2, wherein determining the degree of saturation of the target phase of the target intersection in the current phase cycle based on the first parameter information and the second parameter information includes:
based on the predetermined speed and a predetermined accommodation vehicle number corresponding to the signal light, determining the degree of saturation of the target intersection when the signal light is in the current period in connection with the average speed and the target vehicle number, the predetermined speed being a speed of the vehicle passing through the target route when the route corresponding to the signal light satisfies a predetermined smooth traffic condition.

7. The method according to claim 1, wherein controlling the signal light corresponding to the target phase according to the degree of saturation of the target phase at the target intersection in the current phase cycle includes:
adjusting an illumination time length of at least one light state of the signal light corresponding to the target phase in response to the degree of saturation of the target phase in the current cycle being greater than a predetermined threshold, the signal light including at least two light states.

8. An electronic device comprising:

a processor; and a memory storing a processing program that, when executed by the processor, causes the processor to:

obtain at least two sets of traffic information of a target intersection based on a predetermined cycle;

analyze the at least two sets of traffic information to obtain first parameter information of vehicles passing through and second parameter information of vehicles not passing through a target phase at the target intersection in a current cycle;

determine a degree of saturation of the target phase at the target intersection in a current phase cycle based on the first parameter information and the second parameter information; and control a signal light corresponding to the target phase according to the degree of saturation of the target phase at the target intersection in the current phase cycle.

9. The device according to claim 8, wherein the processor is further configured to:

analyze the at least two sets of traffic information to obtain an average speed of the vehicles passing through the target intersection based on a target route in the current cycle, the target route corresponding to the target phase; and analyze the at least two sets of traffic information to obtain a number of target vehicles not passing through the target intersection at the target phase in the current cycle.

10. The device according to claim 9, wherein the processor is further configured to:

analyze the at least two sets of traffic information to obtain a travel distance of the vehicles passing through the target route at the target intersection when the target signal light is in a target period of the current cycle, the target period being from a start time of a green light state of the signal light at least to an end time of the green light state, the traffic information including vehicle information of a vehicle appearing at the target intersection and information of the signal light at the target intersection; and obtain the average speed of the vehicles passing through the target route at the target intersection in the current cycle based on the travel distance and the target period.

11. The device according to claim 10, wherein the processor is further configured to:

analyze the vehicle information in the at least two sets of traffic information to obtain at least two vehicles passing through the target intersection and travel trajectories of the at least two vehicles; and in response to the travel trajectories of the at least two vehicles being same as a route corresponding to the signal light, determine the travel distance of the at least two vehicles when the signal light is in the target period of the current cycle based on vehicle positions of the at least two vehicles of the vehicle information.

12. The device according to claim 10, wherein the processor is further configured to:

obtain target traffic information at the end time of the green light state of the signal light in the current cycle;

based on the vehicle information of target traffic information, determine the target vehicles not passing through a stop line of the target intersection at the end time of the green light state of the signal light; and count the number of the target vehicles to obtain a target vehicle number.

13. The device according to claim 9, wherein the processor is further configured to:

based on the predetermined speed and a predetermined accommodation vehicle number corresponding to the signal light, determine the degree of saturation of the target intersection when the signal light is in the current period in connection with the average speed and the target vehicle number, the predetermined speed being a speed of the vehicle passing through the target route when the route corresponding to the signal light satisfies a predetermined smooth traffic condition.

14. The device according to claim 8, wherein the processor is further configured to:

adjust an illumination time length of at least one light state of the signal light corresponding to the target phase in response to the degree of saturation of the target phase in the current cycle being greater than a predetermined threshold, the signal light including at least two light states.

15. A non-transitory computer-readable storage medium storing a computer program that, when called and executed by the processor, causes the processor to:

obtain at least two sets of traffic information of a target intersection based on a predetermined cycle;

analyze the at least two sets of traffic information to obtain first parameter information of vehicles passing through and second parameter information of vehicles not passing through a target phase at the target intersection in a current cycle;

determine a degree of saturation of the target phase at the target intersection in a current phase cycle based on the first parameter information and the second parameter information; and control a signal light corresponding to the target phase according to the degree of saturation of the target phase at the target intersection in the current phase cycle.

16. The storage medium according to claim 15, wherein the processor is further configured to:

analyze the at least two sets of traffic information to obtain an average speed of the vehicles passing through the target intersection based on a target route in the current cycle, the target route corresponding to the target phase; and analyze the at least two sets of traffic information to obtain a number of target vehicles not passing through the target intersection at the target phase in the current cycle.

17. The storage medium according to claim 16, wherein the processor is further configured to:

analyze the at least two sets of traffic information to obtain a travel distance of the vehicles passing through the target route at the target intersection when the signal light is in a target period of the current cycle, the target period being from a start time of a green light state of the signal light at least to an end time of the green light state, the traffic information including vehicle information of a vehicle appearing at the target intersection and information of the signal light at the target intersection; and obtain the average speed of the vehicles passing through the target route at the target intersection in the current cycle based on the travel distance and the target period.

18. The storage medium according to claim 16, wherein the processor is further configured to:

analyze the vehicle information in the at least two sets of traffic information to obtain at least two vehicles passing through the target intersection and travel trajectories of the at least two vehicles; and in response to the travel trajectories of the at least two vehicles being same as a route corresponding to the signal light, determine the travel distance of the at least two vehicles when the signal light is in the target period of the current cycle based on vehicle positions of the at least two vehicles of the vehicle information.

19. The storage medium according to claim 16, wherein the processor is further configured to:

obtain target traffic information at the end time of the green light state of the signal light in the current cycle;

based on the vehicle information of target traffic information, determine the target vehicles not passing through a stop line of the target intersection at the end time of the green light state of the signal light; and count the number of the target vehicles to obtain a target vehicle number.

20. The storage medium according to claim 15, wherein the processor is further configured to:

based on the predetermined speed and a predetermined accommodation vehicle number corresponding to the signal light, determine the degree of saturation of the target intersection when the signal light is in the current period in connection with the average speed and the target vehicle number, the predetermined speed being a speed of the vehicle passing through the target route when the route corresponding to the signal light satisfies a predetermined smooth traffic condition.

* * * * *